US012712258B2

(12) United States Patent
Chen et al.

(10) Patent No.: US 12,712,258 B2
(45) Date of Patent: Aug. 18, 2026

(54) BASE STATION ANTENNAS WITH PARALLEL FEED BOARDS

(71) Applicant: Outdoor Wireless Networks LLC, Claremont, NC (US)

(72) Inventors: Changfu Chen, Suzhou (CN); YueMin Li, Suzhou (CN); Haifei Qin, Suzhou (CN); Junfeng Yu, Suzhou (CN); Long Shan, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 374 days.

(21) Appl. No.: 18/502,216

(22) Filed: Nov. 6, 2023

(65) Prior Publication Data

US 2024/0154296 A1 May 9, 2024

Related U.S. Application Data

(60) Provisional application No. 63/382,769, filed on Nov. 8, 2022.

(51) Int. Cl.

| | |
|---|---|
| ***H01Q 1/24*** | (2006.01) |
| ***H01Q 19/10*** | (2006.01) |
| ***H01Q 21/08*** | (2006.01) |

(52) U.S. Cl.
CPC ........... *H01Q 1/246* (2013.01); *H01Q 19/108* (2013.01); *H01Q 21/08* (2013.01)

(58) Field of Classification Search
CPC ....... H01Q 1/246; H01Q 19/108; H01Q 21/08
See application file for complete search history.

(56) References Cited

FOREIGN PATENT DOCUMENTS

| | | | | |
|---|---|---|---|---|
| WO | 2017165512 A1 | 9/2017 | | |
| WO | WO-2021133577 A1 * | 7/2021 | ............. | H01Q 1/246 |

* cited by examiner

*Primary Examiner* — Graham P Smith
(74) *Attorney, Agent, or Firm* — Myers Bigel, P.A.

(57) ABSTRACT

A base station antenna assembly includes: first and second reflectors, the first and second reflectors having first and second sides, being electrically conductive and being disposed generally parallel to each other to form a gap therebetween; a stripline printed circuit board (PCB) positioned in the gap between the first and second reflectors; a first PCB mounted on the first side of the first reflector; a second PCB mounted on the first side of the second reflector so that the second PCB is positioned in the gap; and at least one first radiating element mounted to a first side of the first reflector, the at least one first radiating element having first and second stalks extending through the first PCB, through the first reflector, through the stripline PCB, through the second PCB, and to the second reflector.

18 Claims, 10 Drawing Sheets

BASE STATION ANTENNAS WITH PARALLEL FEED BOARDS

RELATED APPLICATION

The present application claims priority from and the benefit of U.S. Provisional Patent Application No. 63/382,769, filed Nov. 8, 2023, the disclosure of which is hereby incorporated herein by reference in full.

FIELD

The present invention generally relates to radio communications and, more particularly, to radiating elements for base station antennas used in cellular communications systems.

BACKGROUND

Cellular communications systems are well known in the art. In a cellular communications system, a geographic area is divided into a series of regions that are referred to as "cells" which are served by respective base stations. Each base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

Most base station antennas include at least some linear arrays of radiating elements that form static antenna beams that provide coverage to a sector of a base station. Each linear array may be fed by a respective feed network. The feed network connects an RF port of the antenna to each radiating element of the array (or connects two RF ports to the radiating elements of the array if dual-polarized radiating elements are used). The feed network includes a power divider network that divides RF signals input at each RF port into a plurality of sub-components that are fed to the respective radiating elements of the array. The feed network may also include an electromechanical phase shifter that applies a phase progression to the sub-components of the RF signal that acts to apply an electronic downtilt to the antenna beams generated by the linear array.

Typically a coaxial cable connects an RF port of the antenna to an input of the electromechanical phase shifter (which also includes at least some of the power divider network). A plurality of "phase cables" (which also are typically implemented as coaxial cables) carry the sub-components of the RF signal that are output from the phase shifter to feed board printed circuit boards (PCBs) on which the radiating elements are mounted. Solder joints are used to attach the phase cables to both a PCB of the phase shifter and to the feed board PCBs.

There are several potential issues with the above described feed network design. First, the phase shifters are typically implemented using microstrip transmission lines that are formed on the PCB of the phase shifter. These microstrip transmission lines exhibit high insertion loss levels. Additionally, a large number of solder joints are required to connect the phase cables between the phase shifter and the feed board PCBs. These solder joints may be potential sources of passive intermodulation (PIM) distortion. PIM distortion is a form of electrical interference that may occur when two or more RF signals encounter non-linear electrical junctions or materials along an RF transmission path. PIM distortion may be caused by, for example, inconsistent metal-to-metal contacts along an RF transmission path, that may occur, for example, because of contaminated and/or oxidized signal carrying surfaces, loose connections between two connectors, and/or poorly prepared soldered connections. Such non-linearities may act like a mixer causing the RF signals to generate new RF signals (which are called intermodulation products) at mathematical combinations of the original RF signals. These intermodulation products may appear as noise to other RF signals transmitted through the antenna. PIM generated by a single low-quality interconnection may degrade the electrical performance of the entire RF communications system.

Stripline feed networks are known in the art. Stripline feed networks exhibit lower insertion losses and may require fewer solder joints. However, it may be difficult to make the electrical connections between the stripline feed network and the individual radiating elements of the array.

In view of the foregoing, it may be desirable to provide designs that simply construction of a base station antenna, and in particular simplify the attachment of radiating elements to feed boards and reflectors of the antenna.

SUMMARY

As a first aspect, embodiments of the invention are directed to a base station antenna assembly comprising: first and second reflectors, the first and second reflectors having first and second sides, being electrically conductive and being disposed generally parallel to each other to form a gap therebetween; a stripline printed circuit board (PCB) positioned in the gap between the first and second reflectors; a first feed board PCB mounted on the first reflector; a second feed board PCB mounted on the second reflector; and at least one first radiating element mounted to a first side of the first reflector, the at least one first radiating element having first and second feed stalk PCBs, each of which includes a first extension that extends through the first feed board PCB, through the first reflector, through the stripline PCB, through the second feed board PCB, and to the second reflector.

As a second aspect, embodiments of the invention are directed to a base station antenna assembly comprising: first and second reflectors, the first and second reflectors having first and second sides, being electrically conductive and being disposed generally parallel to each other to form a gap therebetween; a stripline printed circuit board (PCB) positioned in the gap between the first and second reflectors; a first feed board PCB mounted on the first side of the first reflector; a second feed board PCB mounted on the first side of the second reflector so that the second feed board PCB is positioned in the gap; and at least one first radiating element mounted to a first side of the first reflector, the at least one first radiating element having first and second feed stalk PCB s that include first rearward extensions that extend through the first feed board PCB, through the first reflector, through the stripline PCB, through the second feed board PCB, and to the second reflector. The first rearward extensions are soldered to the second reflector.

As a third aspect, embodiment of the invention are directed to a radiating element assembly comprising: a radiating element having a feed stalk and a dipole radiator that is mounted adjacent a distal end of the feed stalk; a first feed board printed circuit board (PCB) mounted on the feed stalk; and a second first feed board PCB mounted on the feed stalk, the second feed board PCB spaced apart from the first feed board PCB.

Figure 1:
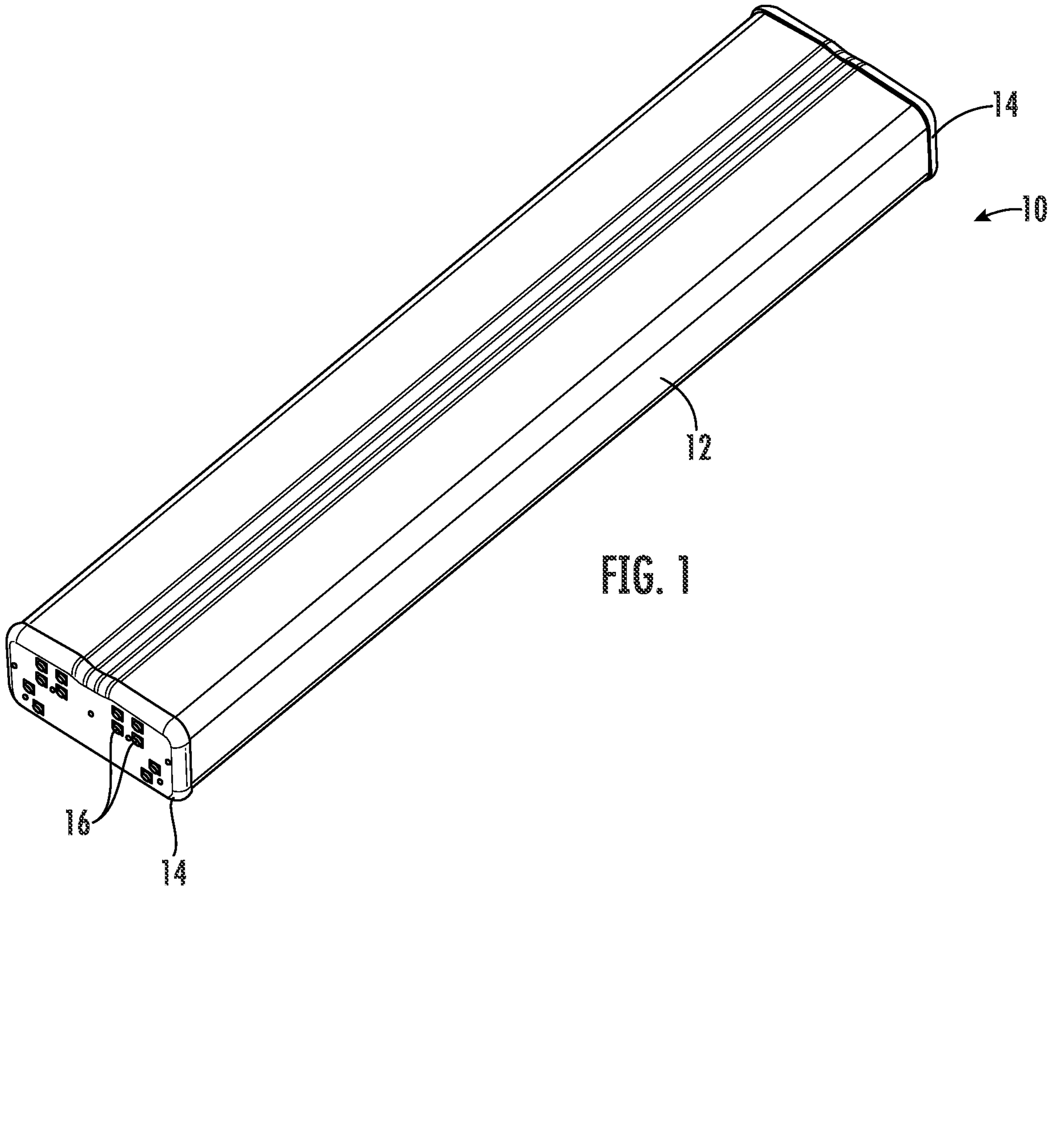
FIG. 1 is a front perspective view of a base station antenna according to embodiments of the present invention.

Note that herein when multiple like elements are provided, the elements may be identified by two-part reference numerals. The full reference numeral (e.g., linear array 30-2) may be used to refer to an individual element, while the first portion of the reference numeral (e.g., the linear arrays 30) may be used to refer to the elements collectively.

DETAILED DESCRIPTION

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those skilled in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features can be changed for clarity.

It should be understood that the words in the Specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms “a”, “an”, “the” and “this” used in the Specification all include plural forms unless clearly indicated. The words “comprise”, “contain” and “have” used in the Specification indicate the presence of the claimed features, but do not exclude the presence of one or more other features. The word “and/or” used in the Specification includes any or all combinations of one or a plurality of the related listed items. The words “between X and Y” and “between approximate X and Y” used in the Specification shall be interpreted as including X and Y. The words “between approximate X and Y” and “from approximate X to Y” used in the Specification means “between approximate X and approximate Y” and “from approximate X to approximate Y”, respectively.

In the Specification, when it is described that an element is “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described “directly” “on” another element, “directly attached” to another element, “directly connected” to another element, “directly coupled” to another element or “directly contacting” another element, there will be no intermediate elements. In the Specification, a feature that is arranged “adjacent” to another feature, may denote that a feature has a part that overlaps an adjacent feature or a part located above or below the adjacent feature.

In the specification, words expressing spatial relations such as “upper”, “lower”, “left”, “right”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings rotates reversely, the features originally described as being “below” other features now can be described as being “above” the other features. The device may also be oriented by other means (rotated by 90 degrees or at other locations), and at this time, a relative spatial relation will be explained accordingly.

Referring now to the drawings, FIG. 1 illustrates a base station antenna, designated broadly at 10, according to embodiments of the invention. The base station antenna 10 is covered by a radome 12 that may be of conventional construction. End caps 14 are mounted at either end of the radome. Ports 16 are present in one end cap 14 to receive cables from a transceiver (not shown).

Figure 2:
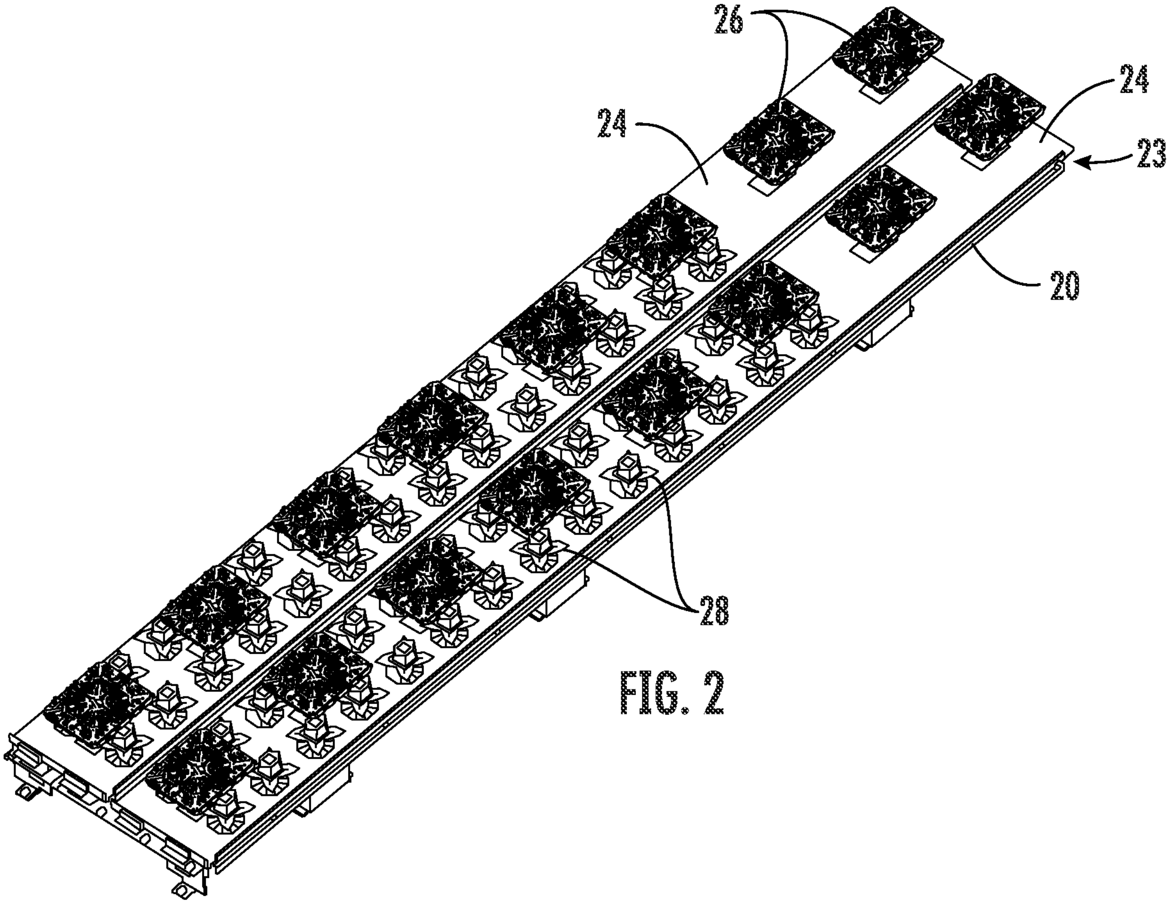
FIG. 2 is a front perspective view of the base station antenna of FIG. 1 with the radome and end caps removed.
Figure 3:
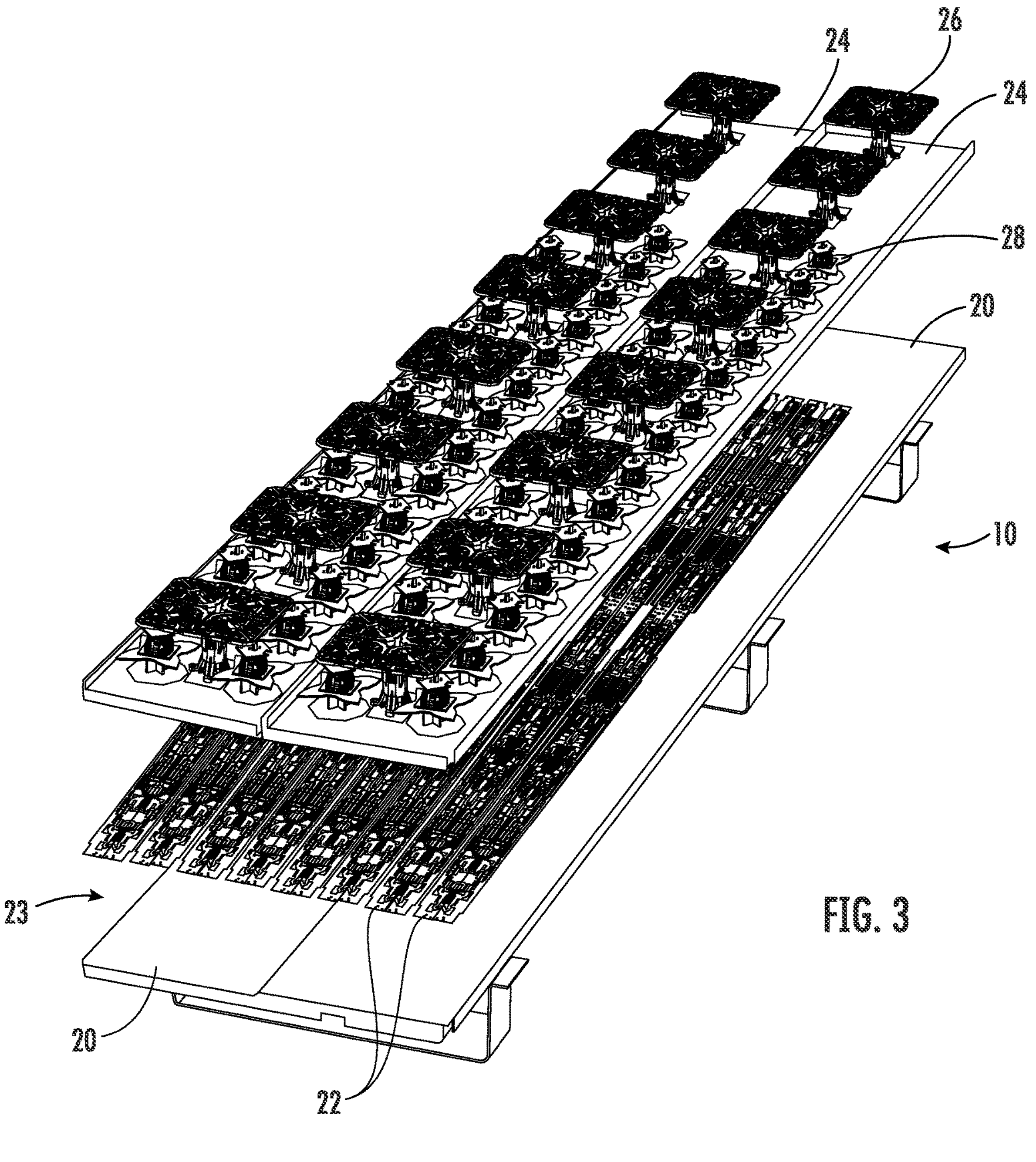
FIG. 3 is an exploded front perspective view of the base station antenna of FIG. 1 with the radome and end caps removed.

As shown in FIGS. 2 and 3, wherein the antenna 10 is illustrated without the radome 12 and the end caps 14, the antenna 10 comprises two rear and two front reflectors 20, 24 (which are essentially pieces of sheet metal). Two stripline PCBs 22 are positioned in a gap 23 between the rear and front reflectors 20, 24. Two different types of radiating elements 26, 28 are mounted on the front reflector 24. Each of these components is discussed in greater detail below.

Figure 4A:
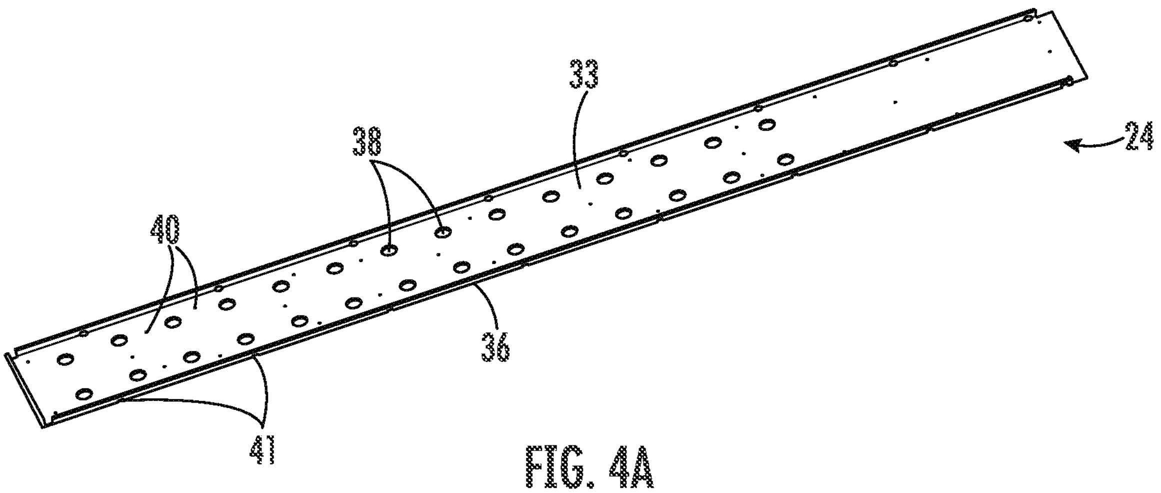
FIGS. 4A and 4B are front perspective views of one of the front reflectors and one of the rear reflectors, respectively, of the base station antenna of FIG. 1.
Figure 4B:
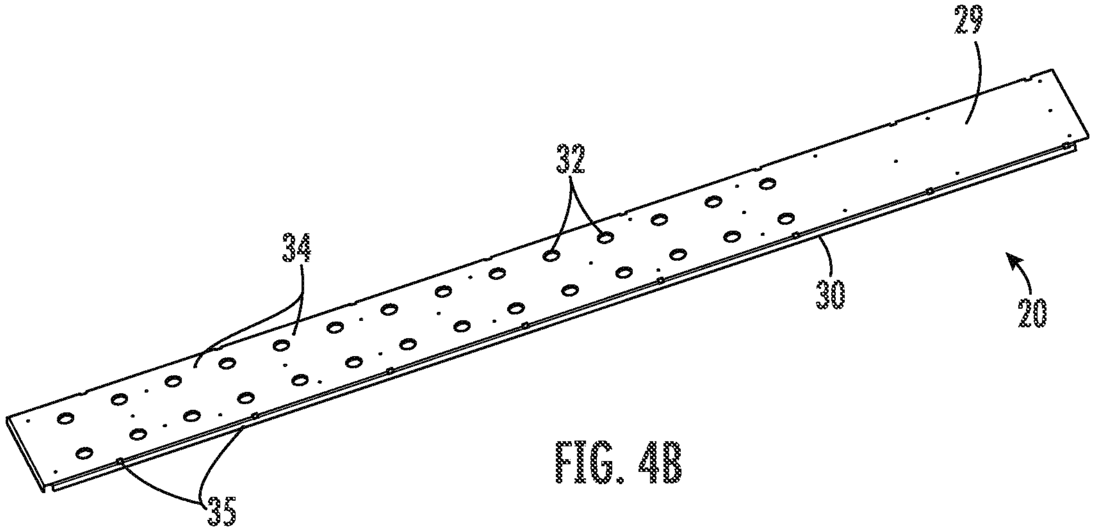
Figure 5A:
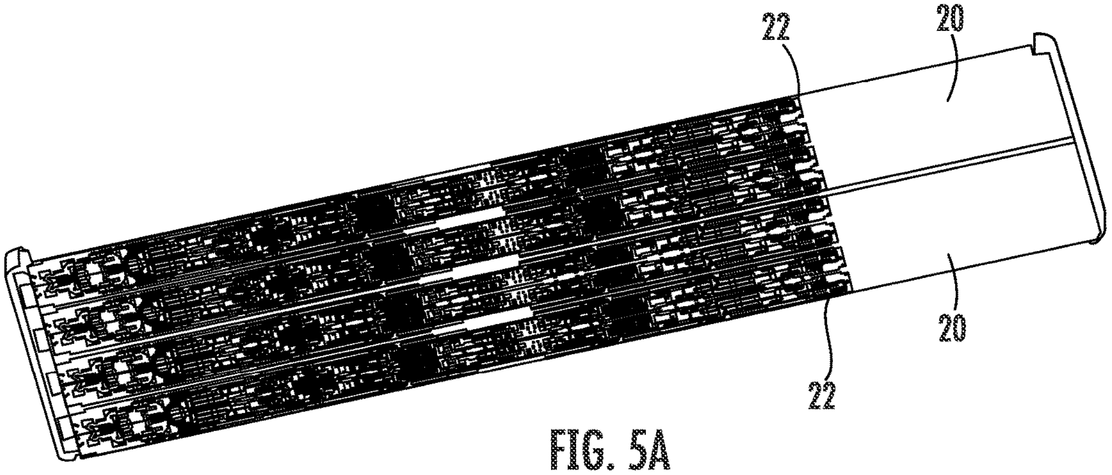
FIG. 5A is a bottom perspective view of the stripline PCBs mounted beneath the front reflectors of the base station antenna of FIG. 1.
Figure 5B:
FIG. 5B is a top view of two of the stripline PCBs.
Figure 5C:
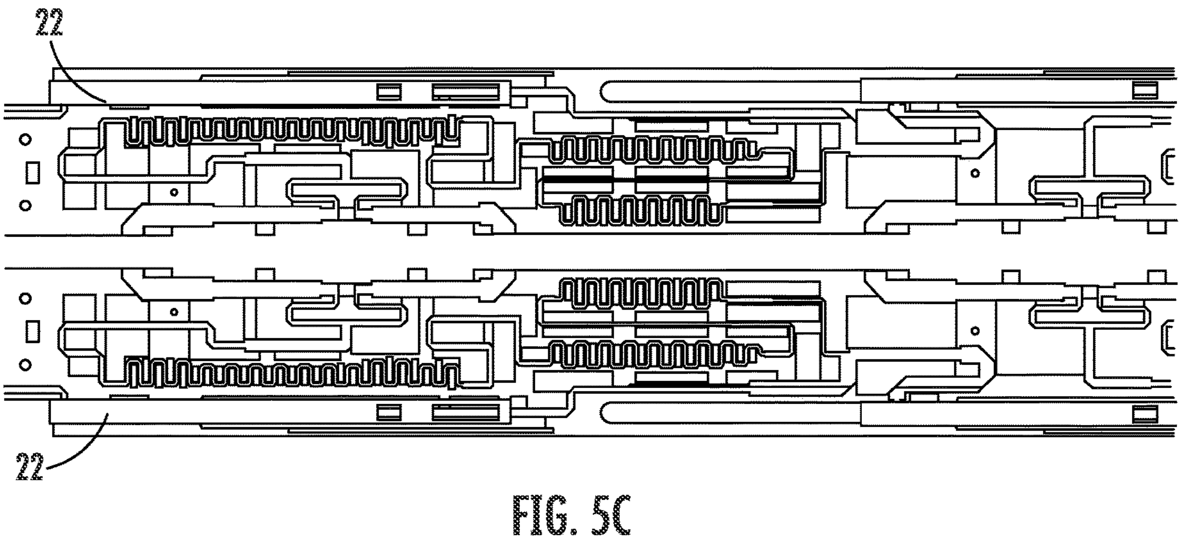
FIG. 5C is a greatly enlarged partial view of the stripline PCBs of FIG. 5B.

FIG. 4B illustrates one of the rear reflectors 20, which as shown is generally planar. Each of the rear reflectors 20 has a main panel 29 and flanges 30 extending rearwardly from the side edges of the main panel 29. Larger holes 32 are arranged in two columns over much of the length of the rear reflector 20. Smaller holes 34 are also dispersed over the length of the rear reflector 20. A series of notches 35 is present at the merging edges of the main panel 29 and the flanges 30.

As shown in FIG. 3, the rear reflectors 20 are disposed adjacent one another, with one of the flanges 30 of one of the rear reflectors 20 being adjacent one of the flanges 30 of the other rear reflector 20. As a result, the main panels 29 of the rear reflectors are substantially coplanar with each other. In some embodiments, the rear reflectors 20 may be combined into a single rear reflector, or more than two rear reflectors 20 may be employed.

FIG. 4A illustrates one of the front reflectors 24, which is very similar to the rear reflectors 20. Each of the front reflectors 24 has a main panel 33 and forwardly-extending flanges 36. Larger holes 38 are arranged in two columns that align with the larger holes 32 on the rear reflector 20, and smaller holes 40 are dispersed over the length of the front reflector 24 that align with the smaller holes 34 of the rear reflector 20. Notches 41 are present at the merging edges of the flanges 36 and main panel 33.

Like the rear reflectors 20, the front reflectors 24 are positioned side-by-side, such that their main panels 33 are substantially coplanar (see FIG. 3). In some embodiments, the front reflectors 24 may be combined into a single front reflector, or more than two front reflectors 24 may be employed.

Referring now to FIGS. 3 and 5A-5C, the stripline PCBs 22 are located between the rear and front reflectors 20, 24; they are disposed side-by-side and are substantially coplanar. The stripline PCBs 22 include circuitry that perform operations during use of the antenna 10. For example, in the illustrated embodiment the stripline PCBs 22 include traces, that along with other separate components (e.g., sliding dielectric members), function as phase shifters for the radiating elements 28 (discussed below). The stripline PCBs 22 may also include contact pads, vias, and the like to facilitate electrical connection with components (such as the radiating elements 28) mounted elsewhere in the antenna 10.

Figure 6:
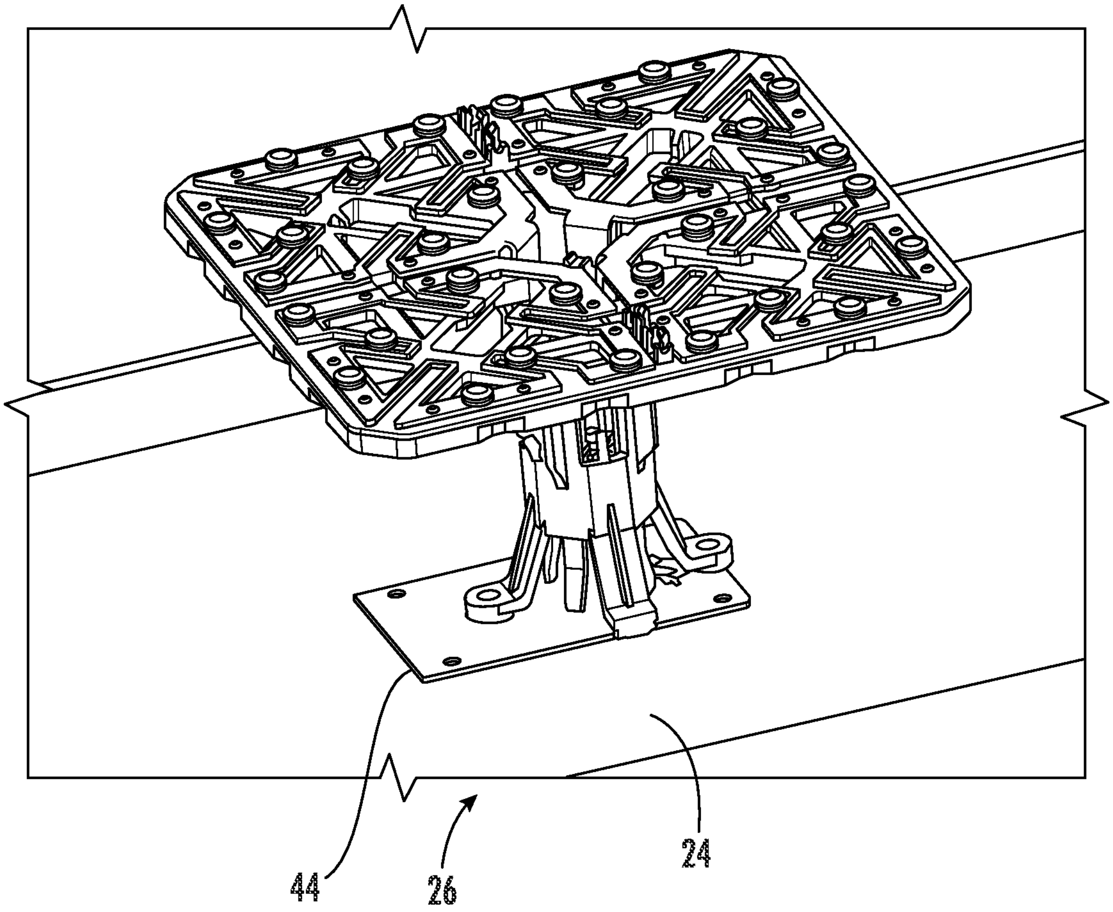
FIG. 6 is a perspective view of a low-band radiating element (and its feed board) of the base station antenna of FIG. 1.

As shown in FIG. 6, the radiating elements 26 are mounted to the front reflector 24. The radiating elements 26 are "low band" radiating elements, which indicates that they transmit RF signals in a range of 617-960 MHz (or a sub-portion of this frequency range, such as 696-960 MHz). Each of the low-band radiating elements 26 is mounted to a respective feed board 44, which is in turn mounted to the upper surface of the front reflector 24. The feed board 44 typically is implemented as a PCB, and serves as a mounting location for one or more radiating elements and may also feed RF signals to the one or more radiating elements. The low-band radiating elements 26 may be of conventional design; a description of an example low-band radiating element can be found in PCT Publication No. WO 2017/165512, the disclosure of which is hereby incorporated herein by reference in full.

Figure 7A:
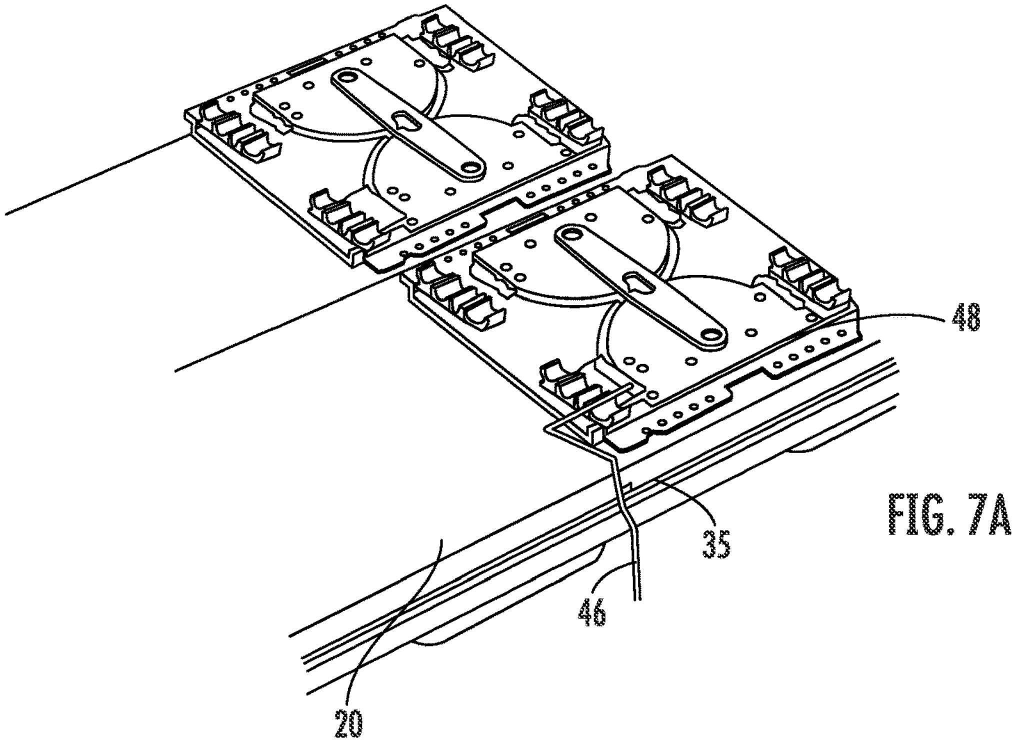
FIG. 7A is partial bottom perspective view of the phase shifter for the low-band radiating elements of the base station antenna of FIG. 1.
Figure 7B:
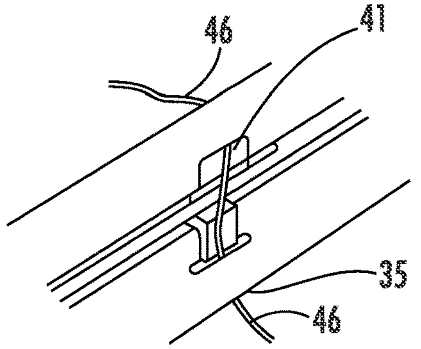
FIGS. 7B and 7C are partial front perspective views of the radiating element of FIG. 6 showing how it is connected with the phase shifter of FIG. 7A.
Figure 7C:
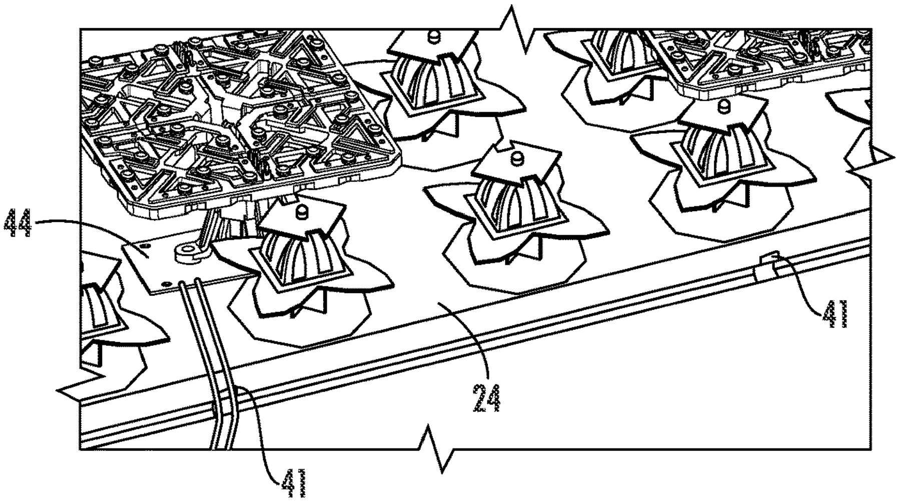

As shown in FIGS. 7A-7C, each of the feed boards 44 is connected with cables 46 that are routed from the feed board 44 through the notches 41 in the front reflector 24, the notches 35 in the rear reflector 20, and to a phase shifter assembly 48 mounted to the underside of the rear reflector (see FIG. 7A). The phase shifter assembly 48 may be of conventional construction; details regarding exemplary phase shifter assemblies 48 may be found in the above-referenced PCT Publication No. WO 2017/165512.

Figure 8A:
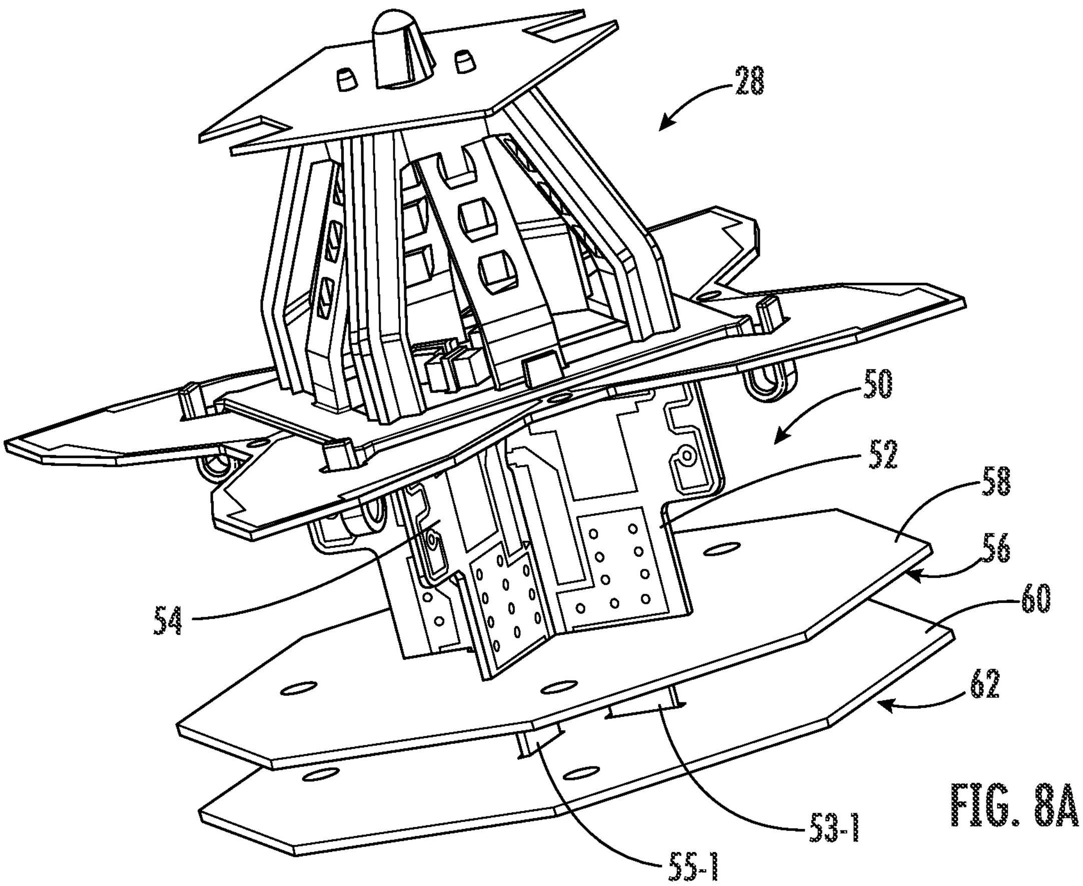
FIGS. 8A and 8B are front and rear perspective views of a mid-band radiating element of the base station antenna of FIG. 1 with front and rear coupling PCBs attached.
Figure 8B:
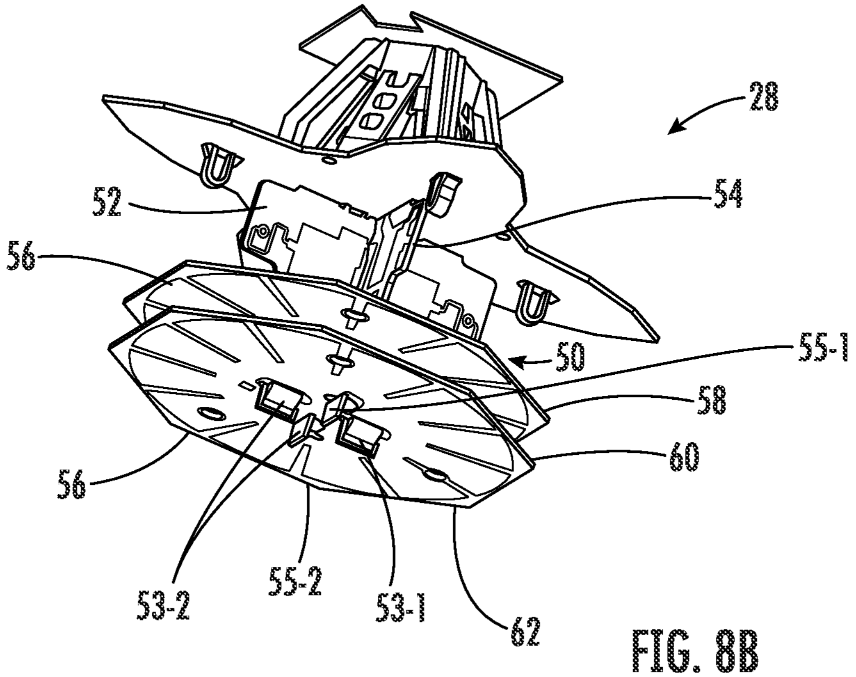
Figure 9:
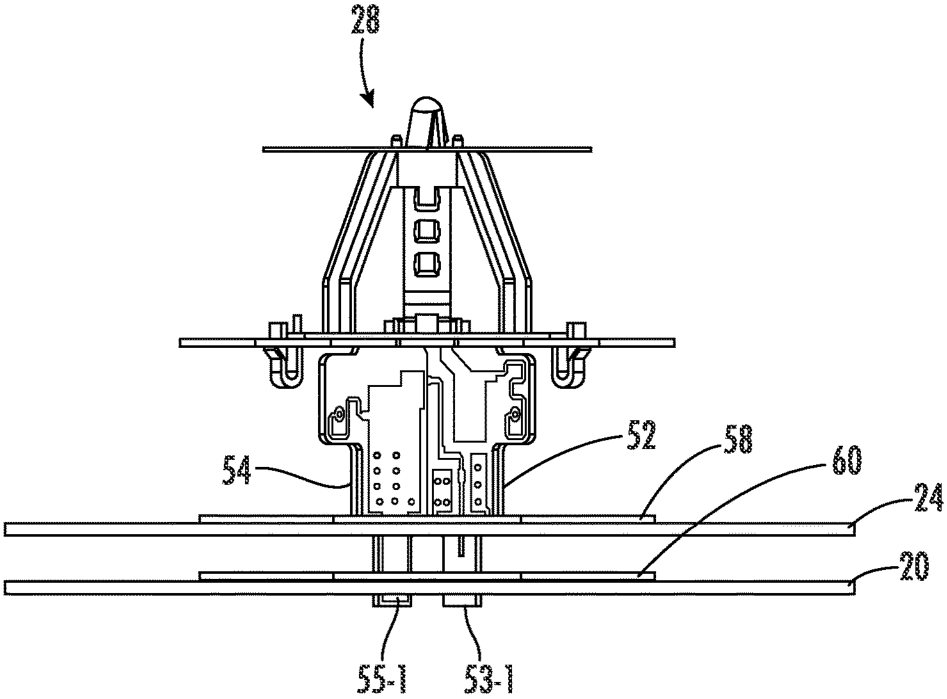
FIG. 9 is a side view of the mid-band radiating element and coupling PCBs mounted on the front and rear reflectors.

Referring now to FIGS. 8A, 8B and 9, each of the radiating elements 28 is mounted forwardly of the larger holes 38 in the front reflector 24. Each of the radiating elements 28 is a "mid-band" radiating element, indicating that they transmit RF signals in a range of 1427-2690 MHz (or a sub-portion of this frequency range, such as 1695-2690 MHz). Each mid-band radiating element 28 is largely of conventional design; however, each mid-band radiating element includes features that facilitate connecting the radiating element 28 to the upper and rear reflectors 24, 20 and to the stripline PCB 22 using a novel connection scheme. Consequently, the discussion herein will focus on the novel connecting features of the mid-band radiating elements. Discussion of conventional features of the dipole radiators, feed stalk RF transmission lines and the like of conventional mid-band radiating elements can be found in the above-referenced PCT Publication No. WO 2017/165512.

Referring now to FIGS. 8A, 8B and 9, each of the mid-band radiating elements 28 includes a feed stalk 50 that comprises a pair of feed stalk PCBs 52, 54 that are mated together. The two feed stalks 50, 52 are separated from each other by 90 degrees relative to the vertical axis of the mid-band radiating element 28. The first feed stalk PCB 52 includes a slit that extends rearwardly from a central portion of the feed stalk PCB 52 to the rear edge of the feed stalk PCB 52, while the second feed stalk PCB 54 includes a slit that extends forwardly from a central portion of the feed stalk PCB 54 to the front edge of the feed stalk PCB 42. The feed stalk PCB 52 is rotated 90° with respect to feed stalk PCB 54 and the slit in feed stalk PCB 52 is inserted into the slit in feed stalk PCB 54 so that the two feed stalk PCBs 52, 54 are joined together so as to appear as an "X" when viewed from the front.

Each feed stalk PCB 52, 54 includes RF transmission paths that are used to couple RF signals between the dipole radiators of the radiating elements 28 and the stripline PCBs 22. More specifically, feed stalk PCB 52 passes RF signals between a +45° polarization dipole radiator of mid-band radiating element 28 and a first of the stripline PCBs 22, and feed stalk PCB 54 passes RF signals between a −45° polarization dipole radiator of mid-band radiating element 28 and the first of the stripline PCBs 22.

Feed stalk PCB 52 includes a pair of rearward extensions 53-1, 53-2, and feed stalk PCB 54 includes a pair of rearward extensions 55-1, 55-2. The rearward extensions 53-1, 53-2; 55-1, 55-2 are much longer than the short, rearwardly extending tabs that are provided on conventional radiating elements having PCB-based feed stalks. These elongated rearward extensions 53-1, 53-2; 55-1, 55-2 that are formed in the feed stalk PCBs 52, 54 are used to electrically connect the RF transmission lines on the feed stalk PCBs 52, 54 to the front and rear reflectors 24, 20 and the stripline PCB 22.

Figure 10:
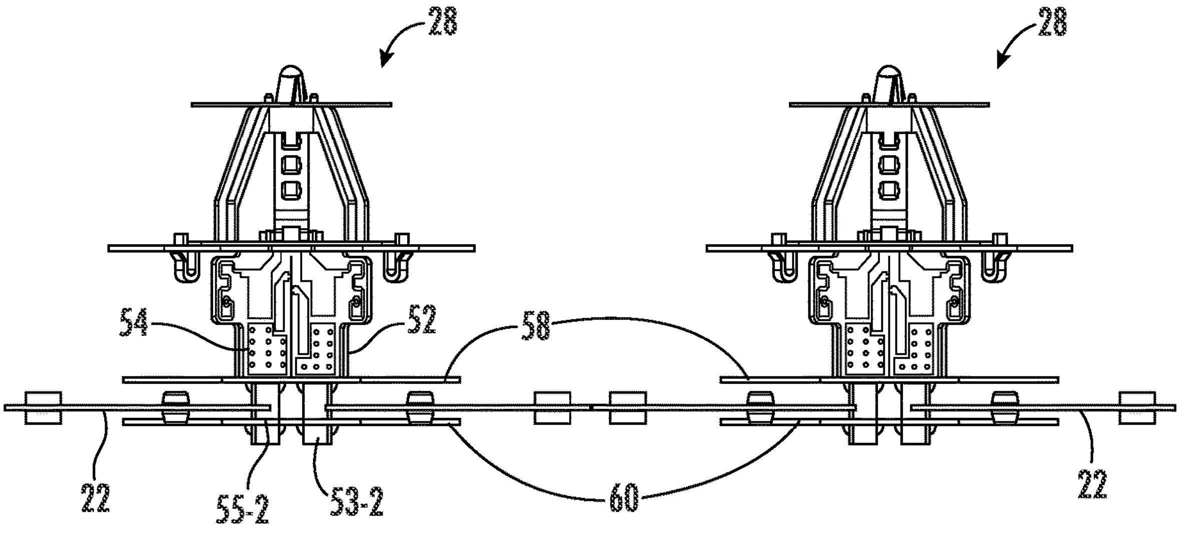
FIG. 10 is a side view of two mid-band radiating elements as in FIG. 9 showing the stripline PCB and the front and rear coupling PCBs.

As is further shown in FIGS. 8A-8B, a front feed board PCB 58 and a rear feed board PCB 60 are coupled to each mid-band radiating element 28. In some embodiments, each of the rearward extensions 53-1, 53-2 of feed stalk PCB 52 and each of the rearward extensions 55-1, 55-2 of feed stalk PCB 54 may include a respective ground line formed thereon. The front feed board PCB 58 and the rear feed board PCB 60 may each include respective first through fourth slots. As shown best in FIGS. 8A-8B, the rearward extensions 53-1, 53-2, 55-1, 55-2 extend through the respective slots in the front feed board PCB 58 and also extend through the respective slots in the rear feed board PCB 60. As shown in FIGS. 9 and 10, the elongated rearward extensions 53-1, 53-2; 55-1, 55-2 also extend rearwardly through the front and rear reflectors 24, 20. In particular, the rearward extensions 53-1, 53-2; 55-1, 55-2 extend through the larger holes 32, 38 in the front and rear reflectors 24, 20 that are shown in FIGS. 4A-4B.

Referring again to FIG. 8B, a large ground pad 56 is provided on a rear surface of the front feed board PCB 58. The ground lines on each of the rearward extensions 53-1, 53-2, 55-1, 55-2 are soldered to the ground pad 56 to electrically connect the ground lines on the rearward extensions 53-1, 53-2, 55-1, 55-2 to the front feed board PCB 58. These solder joints also act to physically mount the mid-band radiating element on the front feed board PCB 58. Similarly, a large ground pad 26 is also provided on a rear surface of the rear feed board PCB 60. The ground lines on each of the rearward extensions 53-1, 53-2, 55-1, 55-2 are also soldered to the ground pad 56 on the rear feed board PCB 60 to electrically connect the ground lines on the rearward extensions 53-1, 53-2, 55-1, 55-2 to the rear feed board PCB 60. The front and rear feed board PCBs 58, 60 may be significantly larger than the large openings 32, 36 in the rear and front reflectors 24, 20. Consequently, the outer portions of the front and rear feed board PCB s 58, 60 overlap the respective front and rear reflectors 24, 20, and the front and rear feed board PCBs 58, 60 are physically mounted on the respective front and rear reflectors. A thin dielectric layer (not shown) such as a solder mask is interposed between the front feed board PCB 58 and the front reflector 24, and a thin dielectric layer (not shown) such as a solder mask is interposed between the rear feed board PCB 60 and the rear reflector 20. Based on this arrangement, each front feed board PCB 58 is capacitively coupled to the front reflector 24, and each rear feed board PCB 60 is capacitively coupled to the rear reflector 20. This arrangement ensures that the ground lines on the feed stalk PCBs 52, 54 are maintained at a common potential with the front and rear reflectors 24, 20.

The mid-band radiating elements may be incorporated into the base station antenna 10 as follows. First, the rearward extensions 53-1, 53-2, 55-1, 55-2 on the feed stalks 52, 54 of each mid-band radiating element 28 may be inserted through the respective first through fourth slots in its associated front feed board PCB 58. Solder joints may be applied on the rear surface of the front feed board PCB 58 at the locations where the ground lines on the rearward extensions 53-1, 53-2, 55-1, 55-2 extend through the slots in the front feed board PCB 58 to electrically connect the ground line on each rearward extension 53-1, 53-2, 55-1, 55-2 to the ground pad 56 on the rear surface of the front feed board PCB 58. These solder joints also act to hold the mid-band radiating element 28 securely in place extending forwardly from the front feed board PCB 58. As shown in FIGS. 9 and 10, next the front feed board PCB 58 is mounted on the front surface of the front reflector 24 with the rearward extensions 53-1, 53-2, 55-1, 55-2 extending through one of the larger holes 38 in the front reflector 24. A solder mask is provided on the front surface of the front reflector that electrically insulates the front feed board PCB 58 from the front reflector 20 (and that forms a capacitive junction therebetween).

As shown in FIG. 9, rearward extension 53-1 also includes a signal trace thereon. While not shown in the figures, rearward extension 55-1 similarly includes a signal trace thereon. As shown best in FIG. 10, rearward extensions 53-1, 55-1 are inserted into respective slots in the stripline PCB 22. The signal traces on rearward extensions 53-1, 55-1 are soldered to respective signal traces on the stripline PCB 22 to physically and electrically connect the signal traces on rearward extensions 53-1, 55-1 to the respective signal traces on one of the stripline PCBs 22. This allows RF signals to be coupled between the mid-band radiating element 28 and the stripline PCB 22.

Next, the rearward extensions 53-1, 53-2, 55-1, 55-2 on the feed stalks 52, 54 of each mid-band radiating element 28 are inserted through the respective first through fourth slots in the rear feed board PCB 60 that is associated with the mid-band radiating element 28. Solder joints are applied to the rear surface of the rear feed board PCB 60 to physically and electrically connect the ground line on each rearward extension 53-1, 53-2, 55-1, 55-2 to the ground pad 56 on the rear surface oof the rear feed board PCB 60.

Next, as shown in FIG. 9, the rear reflector 20 is mounted behind the rear feed board PCB 60. The rearward extension 53-1, 53-2, 55-1, 55-2 of the feed stalk PCBs 52, 54 may extend through the larger holes 32 in the rear reflector 20. A thin dielectric layer (not shown) such as a solder mask is interposed between the rear feed board PCB 60 and the rear reflector 20 so that the ground pad 56 that is provided on a rear surface of the rear feed board PCB 60 is capacitively coupled to the rear reflector 20. This ensures that the ground lines on the feed stalk PCBs 52, 54 are maintained at a common potential with the rear reflector 20.

It should be noted that while the rear feed board PCB 60 is mounted forwardly of the rear reflector 20, embodiments of the present invention are not limited thereto. For example, in other embodiments, the rear feed board PCB 60 may be positioned immediately behind the rear reflector 20. In such embodiments, the rear feed board PCB 60 may be flipped over so that the ground pad 56 thereon faces the rear reflector 20. Likewise, while the front feed board PCB 58 is shown as being mounted forwardly of the front reflector 24, embodiments of the present invention are not limited thereto. For example, in other embodiments, the front feed board PCB 58 may be positioned immediately behind the front reflector 24. In such embodiments, the front feed board PCB 58 may be flipped over so that the ground pad 56 thereon faces the front reflector 24.

Figure 11:
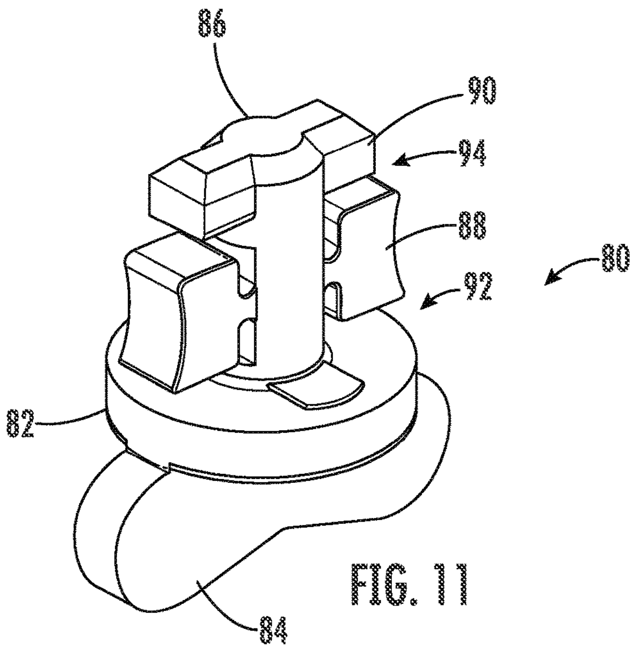
FIG. 11 is a perspective view of one of the quarter-turn spacers used to maintain spacing between the front and rear reflectors of the base station antenna of FIG. 1.

It can be important to maintain substantially uniform, substantially parallel spacing between the rear reflectors 20 and the front reflectors 24 in order to provide consistent performance. The antenna 10 achieves this via the employment of a plurality of quarter-turn spacers 80, one of which is shown in FIG. 11. The spacer 80 includes a base 82 attached to a handle 84, a stem 86 that extends from the base 82 opposite the handle 84, rear wings 88 that extend radially outwardly from the stem 86, and front wings 90 that extend radially outwardly from the front end of the stem 86 parallel to the lower wings 88. A gap 92 is present between the base 82 and the rear wings 88, and a second gap 94 is present between the rear wings 88 and the front wings 90. The rear wings 88 extend radially outwardly from the stem 86 slightly farther than the front wings 90.

Figure 12:
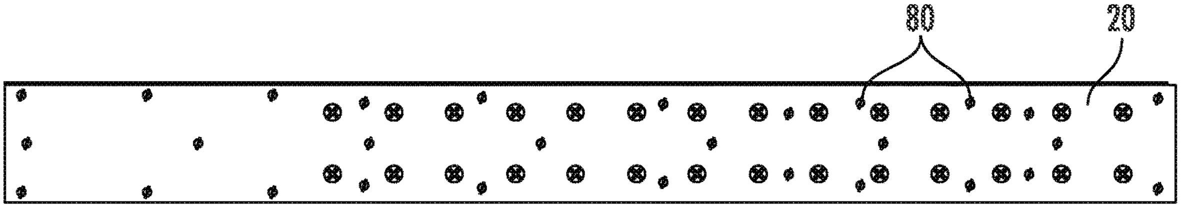
FIG. 12 is a rear view of one of the rear reflectors of the base station antenna of FIG. 1 showing the positioning of the quarter-turn spacers.
Figure 13:
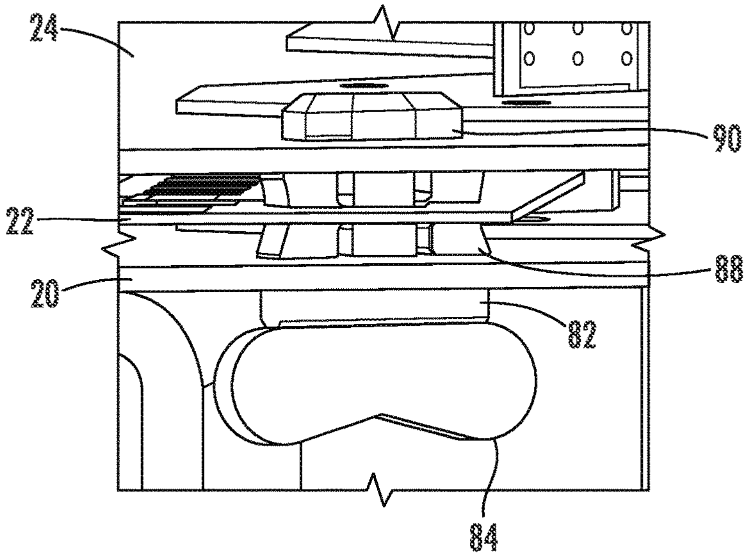
FIG. 13 is a greatly enlarged partial side view of a quarter-turn spacer mounting the front and rear reflectors.

As can be envisioned by examination of FIG. 13, each of the quarter-turn spacers 80 is inserted forwardly through one of the smaller holes 34 in the rear reflector 20, through one of the open spaces in the stripline PCB 22, and through an aligned smaller hole 40 in the front reflector 24. Twisting the handle 84 of the quarter-turn spacer 80 90 degrees causes the rear reflector 20 to be retained in the gap 92, and causes the front reflector 24 to be retained in the gap 94. Thus, by populating all of the smaller holes 34, 40 with quarter-turn spacers 80, the rear reflector 20 and the front reflector 24 are secured relative to each other, and are maintained at a consistent spacing. The arrangement of quarter-turn spacers 80 can be seen in FIG. 12.

Those of skill in this art will appreciate that other types of spacers that maintain the gap between the front and rear reflectors 24, 20 may be employed, and that the arrangement or pattern of the spacers may vary.

Some embodiments of the present invention are exemplarily described above in combination with the accompanying drawings. Those of ordinary skill in the art to which the present invention belongs should understand that specific structures shown in the above embodiments are merely exemplary, rather than limiting. Moreover, those of ordinary skill in the art to which the present invention belongs can combine a variety of technical features shown above according to a variety of possible manners to constitute new technical solutions or make other modifications, and these new technical solutions are encompassed within the scope of the present invention.

What is claimed is:

1. A base station antenna assembly, comprising:

first and second reflectors, the first and second reflectors having first and second sides, being electrically conductive and being disposed generally parallel to each other to form a gap therebetween;

a stripline printed circuit board (PCB) positioned in the gap between the first and second reflectors;

a first feed board PCB mounted on the first reflector;

a second feed board PCB mounted on the second reflector; and at least one first radiating element mounted to a first side of the first reflector, the at least one first radiating element having first and second feed stalk PCBs, each of which includes a first extension that extends through the first feed board PCB, through the first reflector, through the stripline PCB, through the second feed board PCB, and to the second reflector.

2. The base station antenna assembly defined in claim 1, wherein the first and second feed stalk PCBs extend through the second reflector beyond the second side of the second reflector.

3. The base station antenna assembly defined in claim 1, wherein the first and second feed stalk PCBs each further include a second extension that extends through the first feed board PCB, through the first reflector, through the stripline PCB, through the second feed board PCB, and to the second reflector.

4. The base station antenna assembly defined in claim 1, wherein the first extension of the first feed stalk PCB and the first extension of the second feed stalk PCB are electrically connected to the stripline PCB.

5. The base station antenna assembly defined in claim 1, wherein the second extension of the first feed stalk PCB and the second extension of the second feed stalk PCB are electrically connected to the second PCB.

6. The base station antenna assembly defined in claim 1, wherein the first feed board PCB is mounted forwardly of the first reflector and a ground line of the first feed stalk PCB is capacitively coupled to the first reflector.

7. The base station antenna assembly defined in claim 1, further comprising at least one second radiating element, the second radiating element being configured to transmit and receive radio frequency signals at a different frequency than the at least one first radiating element.

8. The base station antenna assembly defined in claim 1, further comprising a phase shifter unit mounted at least partially in between the first and second reflectors.

9. The base station antenna assembly defined in claim 1, wherein the stripline PCB includes a plurality f hollowed out regions where a dielectric of the stripline PCB has been removed.

10. The base station antenna assembly defined in claim 1, further comprising a plurality of spacers mounted to the first and second reflectors to maintain the gap.

11. The base station antenna assembly defined in claim 1, wherein the stripline PCB includes open spaces, and wherein at least some of the plurality of spacers extend through the open spaces.

12. A base station antenna assembly, comprising:

first and second reflectors, the first and second reflectors having first and second sides, being electrically conductive and being disposed generally parallel to each other to form a gap therebetween;

a stripline printed circuit board (PCB) positioned in the gap between the first and second reflectors;

a first feed board PCB mounted on the first side of the first reflector;

a second feed board PCB mounted on the first side of the second reflector so that the second feed board PCB is positioned in the gap; and at least one first radiating element mounted to a first side of the first reflector, the at least one first radiating element having first and second feed stalk PCBs that include first rearward extensions that extend through the first feed board PCB, through the first reflector, through the stripline PCB, through the second feed board PCB, and to the second reflector;

wherein the first rearward extensions are soldered to the second reflector.

13. The base station antenna assembly defined in claim 12, wherein the first rearward extensions of the first and second feed stalk PCBs extend through the second reflector beyond the second side of the second reflector.

14. The base station antenna assembly defined in claim 12, wherein the first and second feed stalk PCBs each further include a second extension that extends through the first feed board PCB, through the first reflector, through the stripline PCB, through the second feed board PCB, and to the second reflector.

15. The base station antenna assembly defined in claim 12, wherein each second extension is electrically connected to the stripline PCB.

16. The base station antenna assembly defined in claim 12, wherein each second extension is electrically connected to the second feed board PCB.

17. The base station antenna assembly defined in claim 12, further comprising a plurality of spacers mounted to the first and second reflectors to maintain the gap.

18. The base station antenna assembly defined in claim 12, wherein the second feed board PCB is mounted in between the first reflector and the second reflector.

* * * * *